Patented Jan. 17, 1950

2,494,810

UNITED STATES PATENT OFFICE 2,494,810

PIGMENT EMULSIONS AND THE MANUFACTURE THEREOF

Cyril Hobday, Otley, and Frederic Leathley Goodall, Burley-in-Wharfedale, England, assignors to The Geigy Company Limited, Manchester, England, a British company No Drawing. Application July 15, 1946, Serial No. 683,770

In Great Britain July 19, 1945

7 Claims. (Cl. 260—29.2)

The present invention relates to pigment emulsions, the manufacture thereof and the dyeing of fabrics therewith.

The term "dyeing" includes the form of localised dyeing commonly termed printing, and the term "fabrics" includes textile materials of any form, paper and leather, particularly chrome leather.

In the dyeing of fabrics it has been customary to use aqueous solutions of dyestuffs, of leuco compounds of dyestuffs or of intermediate products capable of yielding dyestuffs, with or without water-soluble thickening agents.

Water-insoluble pigmentary materials have been applied to fabrics in association with binders such as starch, albumen, casein, alkyl cellulose etc. and the most recent developments have been improved fixation of pigments on fabrics by using, in association with the pigment, a plastic or solid film-forming material such as a natural or synthetic resin, as binder.

It has been possible to obtain a high general standard of fixation of pigments on fabrics, by padding or printing dispersions of pigments in water with water-soluble synthetic resin binders, or of pigments in organic solvents with synthetic resin binders soluble in such solvents. The former, i. e. water-soluble binders give poor fastness to wet rubbing whilst the latter i. e. water-insoluble binders employed in solution in organic solvents, give poor handle usually a marked stiffening effect, to the finished goods. In order to avoid the undesirable handle associated with the continuous film formation resulting from the use of solutions of the binder, particularly in organic solvents, the trend of modern research is to favour the use of emulsions.

Although satisfactory results can be obtained by the use of emulsions of the water-in-oil type, in which of course the external phase is organic solvent, their use is attended by certain disadvantages such as fire and health hazards, employment of high quantities of expensive solvents and difficulty in recovering same, difficulty in cleaning of vessels and appliances etc. It is one object of the present invention to avoid these important disadvantages by the use of emulsions of the oil-in-water type.

We have found, however, that not all emulsions of this type are satisfactory. In such emulsions there are three essential ingredients in addition to the aqueous medium, namely, the oil phase, the binder and the pigment. In order to form an oil-in-water type of emulsion, a water-immiscible organic solvent must serve as the disperse ("oil") phase and the aqueous medium must constitute the continuous phase. We have discovered that if, in emulsions of this type, the pigment is in the "oil" phase and the binder is in the aqueous phase or both the pigment and the binder are in the aqueous phase, the dyed fabrics do not show good fastness to wet rubbing; if the pigment and binder are in the "oil" phase, the dyed fabrics have good fastness to wet rubbing but the emulsions cannot be prepared in concentrated form suitable for distribution and for subsequent dilution according to the shade required at the time and place of application. We have further discovered that emulsions of the oil-in-water type wherein the pigment is in the aqueous phase and the binder is in the "oil" phase can be made in concentrated form, can be highly diluted, i. e. 30 times or more while still retaining satisfactory dispersion and give pigment "dyeings" showing good fastness to wet rubbing.

One object of the present invention is to provide pigment emulsions which give pigment dyeings having good fastness to wet rubbing. Another object is to produce such emulsions which can be readily diluted before use. Another object is to produce pigment emulsions which give pigment dyeings having good fastness to wet rubbing and can give desired shades by dilution. Another object is to provide a method of producing pigment emulsions of high stability which can be diluted. Another object is to obtain pigment dyeings which show good fastness to wet rubbing.

These objects are secured by means of an emulsion of the oil-in-water type wherein the pigment is dispersed in the aqueous phase and the binder is in the oil phase. It is difficult to produce emulsions of this type. It is well known that when pigment pastes are mixed with water and with organic liquids, the tendency is for the pigment to become dispersed in the organic liquid. We have found that this can be avoided by using as the dispersing agent for the pigment a water-soluble compound formed from a non-convertible alkyd resin and ammonia or an alkylolamine.

In connection with their application in the paint, varnish and lacquer industries, alkyd resins are, for convenience, divided into two types, namely, convertible and non-convertible types, according to whether their films are capable of being changed into an insoluble state either by heat or oxidation and are thus of value as the sole film-forming medium or whether they remain unchanged by such process and are employed as adjuncts with other film-forming materials. (Synthetic Resins and Allied Plastics, by Barry, Britton, Langton and Morrell, Oxford University Press, 1943, pages 304 and 305.)

According to one feature of the present invention therefore, there is provided an emulsion having an aqueous continuous phase containing a pigment dispersed therein with the aid of a water-soluble compound formed from a non-convertible alkyd resin and ammonia or an alkylolamine and a disperse phase comprising a water-immiscible organic liquid, such disperse phase containing a thermohardening synthetic resin soluble in the organic liquid. Such an emulsion can be diluted to any desired degree and applied to a fabric in such diluted form, if desired in conjunction with a water-soluble thickener.

The alkylolamine may suitably be triethanolamine.

The thermohardening synthetic resin serves as the binder for the pigment when the emulsion is dried on a fabric.

Examples of suitable thermo-hardening resins are urea-formaldehyde including resins made from homologues and derivatives of urea, such as thiourea, biuret and melamine, as well as heat-convertible phenol-aldehyde condensation products and heat-convertible alkyd resins. Heat-convertible resins are those to which the application of heat gives a completely infusible and insoluble product, the chemical changes involved being irreversible. Heat non-convertible resins are those to which the application of heat causes little or no change in solubility or fusibility. (Synthetic Resins and Allied Plastics, page 10.) Heat-convertible resins are commonly referred to as thermohardening.

The thermohardening synthetic resins may be plasticised with suitable known plasticisers such as dibutyl phthalate or tricresyl phosphate.

The water-immiscible organic liquid must be a solvent for the binder, but must not be a solvent for the pigment to more than a minor extent. The choice of solvent accordingly depends to some extent upon the pigment employed and vice versa. Examples of solvents are benzene, toluene, xylene, solvent naphtha and white spirit.

The invention also includes the process of pigment dyeing of fabrics by applying to them an emulsion having an aqueous continuous phase containing the pigment dispersed therein with the aid of a water-soluble compound formed from a non-convertible alkyd resin and ammonia or an alkylolamine and a disperse phase comprising a water-immiscible organic liquid, such disperse phase containing a thermohardening synthetic resin soluble in the organic liquid. The emulsion may be applied locally, as by printing, or all over as by padding. After the emulsion has been applied to it, the fabric is dried e. g. by heating, to drive off the water and solvent, and leave behind the pigment in association with the binder. The fabric must then be heated for sufficient time and at a sufficient temperature to harden the binder to the desired extent, such time and temperature depending on whether air circulations is used during the hardening treatment. We have found e. g. that 140° C. for 10 minutes is a convenient baking treatment under conditions where hot air circulation is employed.

Fabrics so treated possess excellent fastness to wet rubbing and very good fastness to dry rubbing. As a rule they will remain substantially unchanged after two hours boiling in 0.5% soap and 0.2% sodium carbonate solution even when as little as 0.3% binder is present on the fabric.

The choice of pigments which may be used is not critical. As indicated above, regard must be had to the solubility of the pigment in the solvent but a small amount of bleeding of pigment from the aqueous continuous phase to the solvent phase is ordinarily not objectionable. Examples of pigments which may be used are azo pigments, metal salts of nitroso-beta naphtol, phthalocyanine pigments and inorganic pigments such as iron oxides, chrome yellows and titanium dioxide. Mixtures of pigments may be used.

If the emulsions have been considerably diluted before use, thickeners are preferably added to prevent migration of the pigment during drying. Usually thickeners will also desirably be added if the emulsions are used for printing. These thickeners are preferably added at the time of use, during or after the dilution. Any of the thickeners known and customarily employed in the textile dye printing trade may be used such as alginates, gum tragacanth, British gum or water soluble alkyl celluloses.

Two general methods for making these emulsions are available. In the first of these the pigment is dispersed in water with a water-soluble compound formed from a non-convertible alkyd resin and ammonia or preferably an alkyl-olamine which combines with the non-convertible alkyd resin to form a water-soluble compound. The thermohardening synthetic resin binder dissolved in a water-immiscible organic solvent can then be dispersed in the pigmented aqueous phase and on stirring the water-in-oil emulsion first formed changes to an oil-in-water emulsion without the pigment migrating into the organic solvent phase. A modification of the first method is to disperse the pigment in water containing an alkylolamine or ammonia and stir into this a solution in the water-immiscible organic liquid of the thermohardening synthetic resin binder and the non-convertible alkyd resin. The pigment remains in the aqueous continuous phase of the resulting emulsion.

In the second method, the pigment may first be dispersed in the water-immiscible organic liquid containing the thermohardening synthetic resin binder and non-convertible alkyd resin in solution and then this product emulsified in water with an alkylolamine or ammonia which similarly combines with the non-convertible alkyd resin to form a water-soluble compound. On such emulsification the pigment migrates from the solvent disperse phase into the aqueous continuous phase. The first method is, however, preferred.

In all of these methods there is preferably present, in association with the ammonia or alkylolamine, a soap-forming fatty acid such as oleic acid but the amount thereof must be insufficient to combine with all the ammonia or alkylolamine so that there remains sufficient of the latter substance or substances to combine with the non-convertible alkyd resin.

The invention, in some of its forms, will be illustrated by the following examples:

*Example 1*

5.0 parts by weight Irgalite Orange P (28.6% solids) are dispersed in 10.0 parts by weight alkyd resin mixture composed of 75 parts non-convertible alkyd resin and 25 parts ethyleneglycol monoethylether
1.4 parts by weight oleic acid
2.0 parts by weight triethanolamine
0.5 parts by weight methyl cellulose
30.0 parts by weight water To this dispersion is added slowly, with rapid stirring 10.0 parts by weight solvent soluble urea formaldehyde solution (60 parts resin, 40 parts butanol)
30.0 parts by weight xylene A water-in-oil emulsion first forms which on continued stirring changes into the oil-in-water type. After rapid stirring for several hours a stable emulsion is obtained which can be diluted with water to any desired volume before padding (the alkyd resin used is a non-convertible castor oil modified alkyd resin-acid value 25-30 mgs. KOH per grm). When examined under the microscope the diluted emulsion can be seen to be of the oil-in-water type with the pigment dispersed in the continuous aqueous phase.

A suitable padding bath is made up by adding slowly with stirring, 50-100 parts by weight water to 10 parts by weight of the emulsion depending on the depth of shade required. The fabric is padded cold so that approximately 80-100% take up is obtained, dried preferably at low temperatures and finally cured at 140° C. for 10 minutes in an oven fitted with hot air circulation. To avoid migration (spreading) of the emulsion during drying it is advisable to add a small quantity of water-soluble thickener, such as gum tragacanth, methyl cellulose, sodium alginate or similar compound to the diluted emulsion before padding. The treated fabric is finally soaped with 0.5% soap and 0.2% soda ash solution and dried. The padded fabric possesses outstanding fastness to wet rubbing and boiling soap solution, good fastness to dry rubbing and the handle and drapability of the original fabric is largely maintained.

*Example 2*

5.0 parts by weight Irgalite Orange P (28.6% solids) are dispersed in
10.0 parts by weight alkyd resin mixture composed of 60 parts non-convertible alkyd resin and 40 parts xylene.
5.0 parts by weight solvent soluble urea formaldehyde solution (60 parts resin 40 parts butanol)
20.0 parts by weight xylene
5.0 parts by weight cyclohexanol.

This lacquer is then emulsified into 30.0 parts by weight water
1.4 parts by weight oleic acid
2.5 parts by weight triethanolamine
0.5 part by weight methyl cellulose.

On emulsification, the pigment migrates from the solvent phase into the aqueous continuous phase.

*Example 3*

5.0 parts by weight Irgalite Orange P (28.6% solids) are dispersed in
30.0 parts by weight water
1.4 parts by weight oleic acid
2.5 parts by weight triethanolamine
0.5 part by weight methyl cellulose.

To this aqueous dispersion is added slowly with stirring:

10.0 parts by weight alkyd resin mixture composed of 60 parts non-convertible alkyd resin and 40 parts xylene
5.0 parts by weight solvent soluble melamine formaldehyde solution (55 parts resin 45 parts butanol).
20.0 parts by weight xylol
5.0 parts by weight cyclohexanol.

The pigment remains in the aqueous continuous phase of the resulting emulsion.

It will be appreciated that the invention is not limited to the preferred forms shown in the above examples.

We declare that what we claim is:

1. The method of making a pigment emulsion which comprises dispersing a pigment in an aqueous medium with the aid of a dispersing agent comprising a non-convertible alkyd resin and a basic substance selected from the group which consists of ammonia and alkylolamines and further dispersing in said aqueous medium a solution of a thermohardening synthetic resin in an organic liquid which is substantially non-solvent for said pigment.

2. The method of making a pigment emulsion which comprises dispersing a pigment in an aqueous medium with the aid of a non-convertible alkyd resin and a basic substance selected from the group which consists of ammonia and alkylolamines and further dispersing in said aqueous medium a solution in organic solvent of a urea-formaldehyde resin.

3. An emulsion having an aqueous continuous phase, a first disperse phase comprising pigment, a dispersing agent for said pigment comprising a non-convertible alkyd resin and a basic substance selected from the group which consists of ammonia and alkylolamines, and a second disperse phase comprising an organic liquid which is substantially non-solvent for said pigment but contains in solution a thermohardening synthetic resin.

4. An emulsion having an aqueous continuous phase, a first disperse phase comprising pigment, a dispersing agent for said pigment comprising a non-convertible alkyd resin and a basic substance selected from the group which consists of ammonia and alkylolamines and a second disperse phase comprising an organic liquid which is substantially non-solvent for said pigment but contains in solution a urea-formaldehyde resin.

5. An emulsion having an aqueous continuous phase, a first disperse phase comprising pigment, a dispersing agent for said pigment comprising a non-convertible alkyd resin and a basic substance selected from the group which consists of ammonia and alkylolamines and a second disperse phase comprising a hydrocarbon liquid which is substantially non-solvent for said pigment but contains in solution a thermohardening synthetic resin.

6. The process of pigment dyeing of a fabric which comprises applying to said fabric an emulsion having an aqueous continuous phase, a first disperse phase comprising pigment, a dispersing agent for said pigment comprising a non-convertible alkyd resin and a basic substance selected from the group which consists of ammonia and alkylolamines and a second disperse phase comprising an organic liquid which is substantially non-solvent for said pigment but contains in solution a thermo-hardening synthetic resin, drying the fabric and then heating it to harden the resin.

7. The process of pigment dyeing of a fabric which comprises applying to said fabric an emulsion having an aqueous continuous phase, a first disperse phase comprising pigment, a dispersing agent for said pigment comprising a non-convertible alkyd resin and a basic substance selected from the group which consists of ammonia and alkylolamines and a second disperse phase comprising an organic liquid which is substantially non-solvent for said pigment but contains in solution a urea-formaldehyde resin.

CYRIL HOBDAY.
FREDERIC LEATHLEY GOODALL.

REFERENCES CITED

The following references are of record in the file of this patent:

UNITED STATES PATENTS

| Number | Name | Date |
| --- | --- | --- |
| 1,967,220 | Barrett et al. | July 24, 1934 |
| 2,342,642 | Cassel | Feb. 9, 1944 |
| 2,364,692 | Cassel | Dec. 12, 1944 |

OTHER REFERENCES

Official Digest, Fed. of Paint and Varnish Production Clubs, February 1943, Pages 42, 43 and 45.
National Paint Bulletin, vol. 9, No. 4, April 1945, Page 6.